Feb. 18, 1958
C. W. VOGT
2,823,750
DESK TYPE TAPE HOLDER AND DISPENSER
Filed May 11, 1954
2 Sheets-Sheet 1
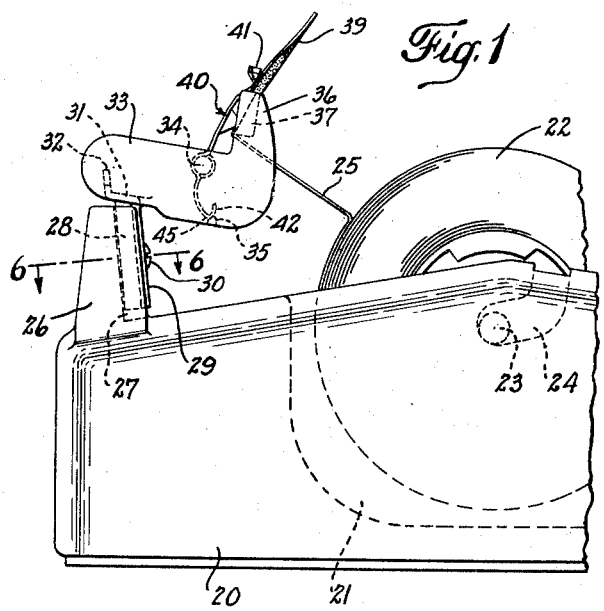
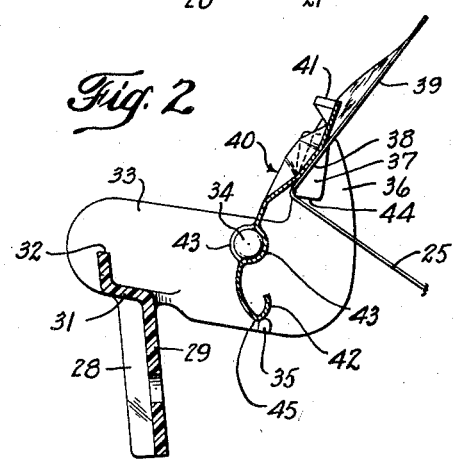
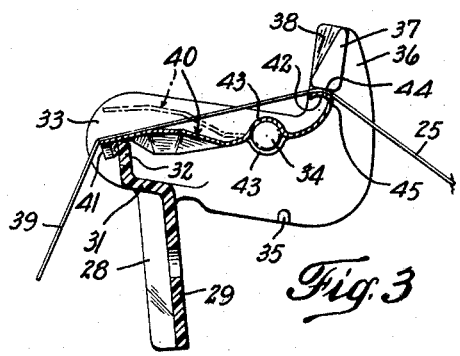
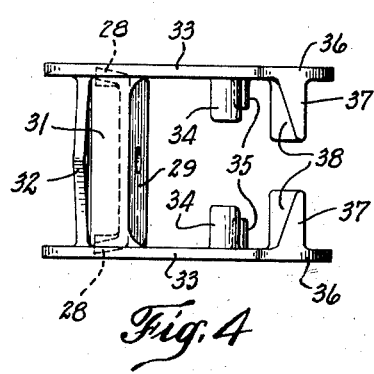
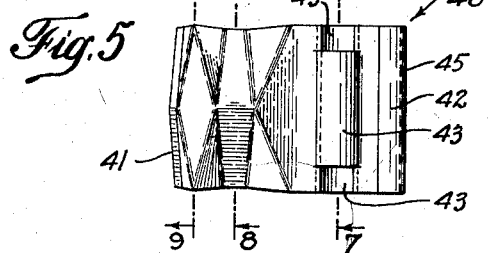
INVENTOR.
CLARENCE W. VOGT
BY
Campbell, Brumbaugh, Free & Graves
ATTORNEYS.

Feb. 18, 1958 C. W. VOGT 2,823,750
DESK TYPE TAPE HOLDER AND DISPENSER
Filed May 11, 1954 2 Sheets-Sheet 2
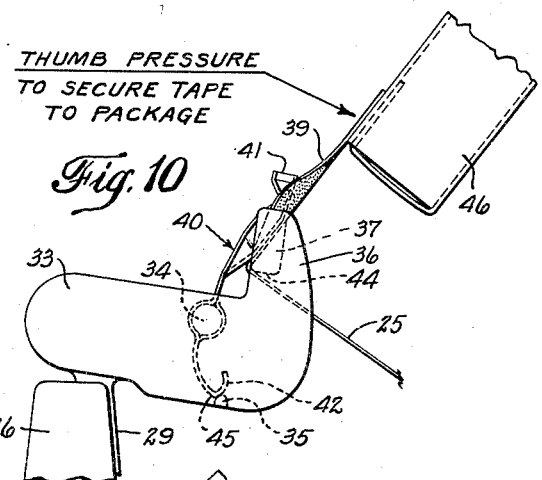
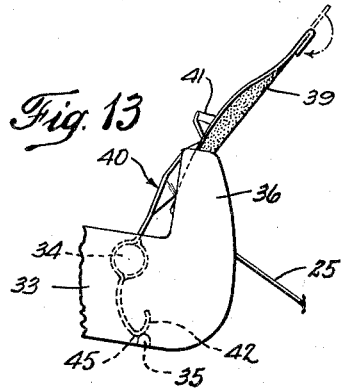
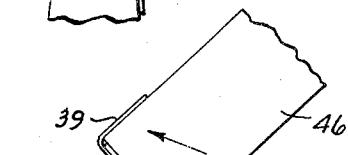
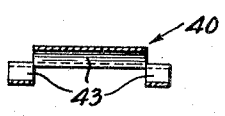
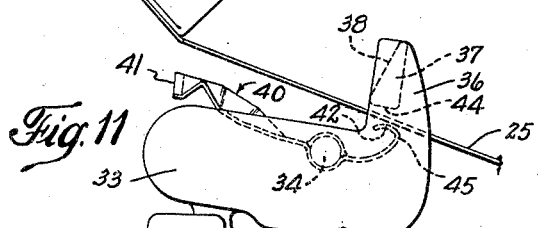
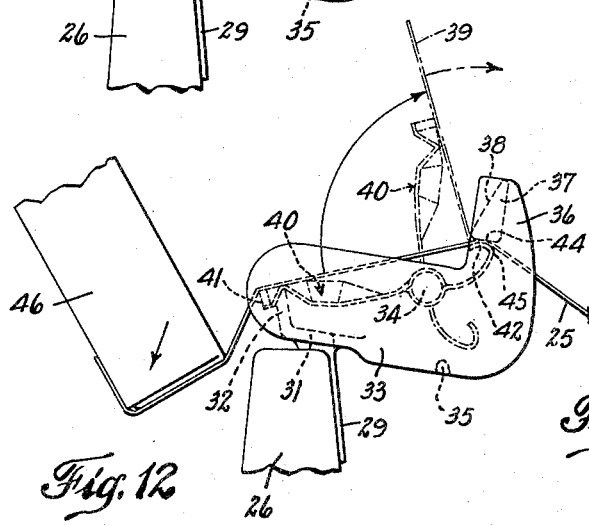
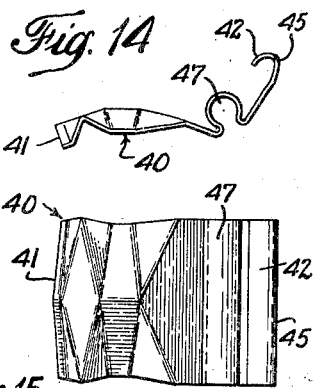
INVENTOR.
CLARENCE W. VOGT
BY
Campbell, Brumbaugh, Free & Graves
ATTORNEYS.

United States Patent Office
2,823,750
Patented Feb. 18, 1958

2,823,750

DESK TYPE TAPE HOLDER AND DISPENSER

Clarence W. Vogt, Weston, Conn.

Application May 11, 1954, Serial No. 428,884

10 Claims. (Cl. 164—84.51)

This invention relates to devices by means of which adhesive tape may be operably positioned upon a surface such as a desk or table and, while so positioned, dispensed in suitable lengths. In applicant's co-pending application Serial No. 405,538, filed January 22, 1954, there is described a form of tape dispensing and applying mechanism that is adapted to be used by being held in the hand while the tape is being applied. The tape snubbing and cutting mechanism of this previously filed application is somewhat similar to the corresponding mechanism of the present invention but, in certain essential characteristics, the present invention is different and has for an object the provision of a device of the above character that is suitable for being supported upon a desk or table and from which tape may be dispensed and severed when and as desired.

More particularly, the invention contemplates the provision of a tape dispensing device of the above character by means of which the free end of the tape may be positioned in such fashion that it may be readily grasped for application to a desired surface. To this end, the invention provides means by which the free end of the tape may be maintained in a relatively exposed position and also in a condition such that it has an inherent rigidity to permit the free end to be manipulated in such fashion that it may be directly applied where desired or, if desired, to permit at least a portion thereof to be folded back and adhered to an adjacent portion of the tape to provide a limited area on the free end of the tape which will not adhere to the surface to which the tape is later applied.

In order to accomplish these and further objects, the invention includes mechanism by means of which the free end of the tape may have imparted to it a slight curvature longitudinally of the tape in order to cause the free end to be somewhat rigid while being maintained in such position. In accordance with the invention, the mechanism by means of which this is accomplished includes a resilient tongue, upon the end of which a cutting mechanism is provided so that, upon severing the tape by the cutting mechanism, the mechanism will, by spring action, deflect the free end of the tape against a backing member formed to impart curvature to the free end as above-mentioned.

In order that the invention may be understood more fully, it will now be described with reference to the accompanying drawings wherein:

Fig. 1 is a partial view in side elevation showing a mechanism constructed in accordance with the present invention;

Fig. 2 is an enlarged detail view, taken in longitudinal vertical section, showing the tape severing and positioning mechanism of Fig. 1;

Fig. 3 is a view similar to Fig. 2 illustrating the manner in which the tape is snubbed and cut when a sufficient quantity has been dispensed;

Fig. 4 is a plan view of the mechanism shown in Fig. 2 with the cutting element removed;

Fig. 5 is a plan view of the cutting element shown in Figs. 2 and 3;

Fig. 6 is a view in horizontal section, taken on the plane indicated by the line 6—6 of Fig. 1 and looking in the direction of the arrows, this view being somewhat enlarged;

Fig. 7 is a view in transverse section taken on the plane indicated by the line 7—7 of Fig. 5 and looking in the direction of the arrows;

Fig. 8 is a view similar to Fig. 7 taken on the line 8—8 of Fig. 5;

Fig. 9 is a view similar to Fig. 7 taken on the line 9—9 of Fig. 5;

Fig. 10 is a partial view similar to Fig. 1, and somewhat enlarged, showing the manner in which the free end of the tape is applied to a desired surface;

Fig. 11 is a view similar to Fig. 10 showing the manner in which the device may be used to permit the tape being dispensed to be applied about the perimeter of a package;

Fig. 12 is a view similar to Fig. 10 illustrating the manner in which the dispensed tape is severed from the tape remaining in the apparatus;

Fig. 13 is a partial view similar to Fig. 10, illustrating the manner in which the free end of the tape is maintained in a relatively rigid position to facilitate manipulation thereof;

Fig. 14 is a view in side elevation showing a modified form of snubbing and cutting blade; and Fig. 15 is a plan view showing the modified form of blade illustrated in Fig. 14.

A suitable base is illustrated at 20 as being formed with a recess or well 21 within which a roll of adhesive tape 22 is adapted to be received. To mount the roll in the recess, the core of the roll may be provided with a spool or adapter having stub shafts 23 which are received within slots 24 formed within the sides of the well 21. The tape is adapted to be peeled from the roll, the end 25 thereof being directed to a snubbing and cutting device now to be described.

The base 20 is provided with an upwardly extending standard 26 which may, if desired, be provided with slots 27 to receive flanges 28 formed upon a mounting plate 29. If it is desired to secure the mounting plate fixedly to the base, a screw 30 may be provided as illustrated in Fig. 6.

The plate 29 is formed with a bridge 31 having a stop 32 against which a cutting element may engage during operation as illustrated in Fig. 3. Side plates 33 are formed on the bridge 31 and are provided with inwardly extending pins 34 upon which a snubbing and cutting blade is adapted to be mounted, as will be presently described. Also formed upon the side plates 33 are projections 35 for a purpose presently to be described.

The side plates 33 are formed with extensions 36 having inwardly projecting flanges 37 formed thereon. The upper faces of the flanges 37 are sloped upwardly and rearwardly to form backing surfaces 38 against which the free end 39 of the tape is adapted to be pressed by means of a snubber and cutter tongue indicated generally at 40.

The tongue 40 is formed, at the lefthand extremity thereof (as viewed in Figs. 3 and 5), with a cutting edge 41 and, at the righthand extremity, with a snubbing surface 42. Adjacent the snubbing surface 42, the tongue is formed with stamped-out journal members 43 which are adapted to be received over the stub shafts 34 in order that the tongue may pivot about such shafts. As illustrated in Figs. 1, 2 and 3, the snubbing surface and the portion of the tongue adjacent thereto are formed in such fashion that the snubbing surface is adapted to engage and press the adhesively coated tape against the lower surfaces 44 of the flanges 37 in order to snub the tape and prevent the same from being withdrawn while it is being severed as illustrated in Fig. 3.

The tongue portion adjacent the snubbing surface 42 is formed as a curved nose 45 which engages and rides over the projections 35 as the cutting extremity of the tongue moves in a clockwise direction following the severance of the tape. The final movement in this direction causes the surface of the nose 45 to ride over the projections 35 and to be engaged by the projections to maintain the tongue yieldingly in the position illustrated in Fig. 2.

As will be seen in Fig. 3, the tape is severed by moving the free end thereof downwardly to force the tongue 40 from the dot-and-dash position illustrated in Fig. 3 to the full-line position. This motion of the tongue is arrested by the stop 32, and continued pressure on the tape will cause its severance. The spring action of the tongue is then released and the tongue springs forwardly in a clockwise direction to cause the extremity 45 to engage over the projections 35 as illustrated in Fig. 2. This motion moves the free end of the tape 39 against the flanges 37, as illustrated in Figs. 1 and 2. Inasmuch as the surfaces 38 of the flanges slope inwardly and upwardly, the tongue causes the free end 39 of the tape to be curved longitudinally to impart sufficient rigidity thereto to maintain the free end in the desired position illustrated and to facilitate manipulation of the free end. For example, if the free end or a portion thereof is adapted to be folded over to form a portion of the free end of the tape as a tab that will not adhere to a desired surface, this is readily accomplished as illustrated in Fig. 13. This is of advantage where it is desired to apply the tape in such fashion as to permit it to be readily stripped from the surface to which it has been applied so that it may be removed without difficulty.

Inasmuch as the center of motion of the tongue is about the stub shafts 34, the free end of the tape 39 will extend considerably beyond the free end of the cutter (as illustrated in Fig. 2) because the movement of the tape is about the bottom edge of the flanges 37, this location being spaced from the axis of the stub shafts 34.

As illustrated in Figs. 3 and 5, the tongue 40 may have rigidity imparted thereto between the cutting edge 41 and the journal members 43 by suitably bending or otherwise forming the tongue with angularly related surfaces.

Figs. 10 to 13 inclusive illustrate the manner in which the device constructed in accordance with the present invention may be utilized to apply tape to an article. Inasmuch as the free end 39 thereof projects freely into a convenient and unobstructed location, an article 46 may have the free end applied thereto (it being understood that the adhesive side of the tape is illustrated as stippled and as the side engaging the surfaces 38). The article with the tape adhered thereto is then pulled forwardly and downwardly (as viewed in Figs. 10 and 11) to cause the snubbing end of the tongue 40 to be released from the projections 35 and to free the tape from the snubbing surfaces. The tape is then wrapped around the article to the extent desired, after which the article, with the tape secured thereto, is lowered until the cutting edge severs the tape (Fig. 12), at which time the free end of the tape is impelled in a clockwise direction by the tongue 40, as illustrated in dot-and-dash lines and arrows in Fig. 12. The final stage of the operation is reached when the snubbing end of the tongue rides over the projections 35 to maintain the free end of the tape in the position illustrated in Fig. 13. Whether or not the tongue is held in such position by the projections 35, the adhesive or tacky side of the tape adheres to the surfaces to hold the tape in the position illustrated in Fig. 13.

Figs. 14 and 15 show a modified form of snubbing and cutting tongue wherein the mechanism is of a snap-on type. To this end, a curved channel 47 is formed in the tongue instead of the journal portions 43, thus permitting the tongue to be snapped over the stub shafts 34. It will be understood, of course, that the stub shafts 34 may be formed as a continuous pin extending between the side plates 33. By forming the channel 47 or the journal portions 43 adjacent the snubbing end of the tongue, the spring action of the cutting end of the tongue is increased to facilitate the operation above-described. The channel formation 47 also facilitates assembly and replacement of the tongues.

From the foregoing, it will be seen that the invention provides means whereby the free end of the tape is maintained in an exposed position with sufficient rigidity imparted thereto, in view of the fact of its curved configuration, to enable the free end to be manipulated as desired. Not only does this assure that the free end will be readily available, but it prevents any natural curl that may exist in the structure of the tape from causing the free end to curl backwardly and adhere to adjacent portions of the tape or to other surfaces.

It will also be observed that the sudden release of the tension applied to the tape during the snubbing and cutting operation is utilized to direct the free end to a definite position where it may be contacted directly on either or both the tacky or non-tacky surfaces. In dispensers now available, the tacky surface at the end of the tape adheres to the surface adjacent the cutting edge, thus making the end unavailable for direct contact with a desired surface without using the fingers to first free it from the surface to which it is anchored. This invention thus not only provides a free and exposed tape end but also permits the cutting of the tape to be accomplished by a downward cutting movement.

I claim:

1. In combination with means to support a roll of adhesive tape, tape positioning, snubbing and cutting means comprising at least one side plate, means to mount a roll of tape on the plate, a tape positioning member on the plate, a resilient snubbing and cutting tongue having a cutting edge on one end to sever a strip of tape drawn from the roll and a tape snubbing portion as its other end, said tongue being stiffened adjacent to said cutting edge, means engaging said tongue between its ends to pivot the tongue on said side plate below said member for movement between a first position, by pulling the tape downwardly against the cutting edge, in which said tape is snubbed between said member and said snubbing portion and a second position in which said tape is gripped between said member and a portion of said tongue adjacent to said cutting edge, said tongue being flexed in said first position by engagement with said member and by pulling said tape downwardly, the resiliency of the tongue, when flexed, normally urging said tongue member toward said second position.

2. Apparatus according to claim 1 wherein at least one of the tongue and positioning members is formed with portions having non-planar surfaces.

3. Apparatus according to claim 1 wherein the tongue has portions having non-planar surfaces adjacent to its cutting edge to stiffen the latter.

4. Apparatus according to claim 1 wherein the tape positioning member lies in a plane at an angle to the direction of movement of the tape as it leaves the roll.

5. Apparatus according to claim 1 wherein the pivot means includes means on the tongue spaced nearer one end thereof than the other.

6. Apparatus according to claim 1 wherein the tongue is formed at one end with a cutting edge and at the other with a snubbing surface and wherein the pivot means is adjacent the snubbing surface.

7. Apparatus according to claim 1 wherein the tape positioning member comprises spaced-apart flanges having tape engaging surfaces at angles to each other.

8. The apparatus set forth in claim 1 in which the tongue has a central hub portion receiving said pivot means and oppositely diverging arms extending from said hub portion, one of said arms having the cutting edge at its outer end.

9. Apparatus according to claim 1 comprising tape stiffening means extending from said side plate a detent on at least one of the side plates to engage and flex the tongue and retain it releasably adjacent to the tape stiffening means.

10. In a device for dispensing tape of the pressure sensitive type, means for rotatably supporting a roll of tape, means on the supporting means and spaced from the roll of tape to position the end of the tape extending from the roll at an angle to the direction of movement of the tape from the roll and above the plane of such movement, a resilient tongue having a stiffened cutting edge portion at one end and a resilient snubbing portion at its opposite end, snubbing and tape positioning means on said supporting means above the plane of movement of the tape, and means pivotally supporting said tongue between its ends for movement to a first position engaging the tape between one end of the tongue and the tape positioning and snubbing means by pulling the tape downwardly against the end of the tongue to sever the tape, and to a second position engaging the tape between the opposite end of the tongue and said tape positioning and snubbing means, said resilient snubbing portion being flexed in said first position by engagement with said snubbing and tape positioning means and by pulling said tape downwardly, and said resilient snubbing portion, when flexed, normally urging the tongue towards said second position.

References Cited in the file of this patent

UNITED STATES PATENTS

| | | |
|---|---|---|
| 2,158,790 | Arthur | May 16, 1939 |
| 2,344,340 | Adams | Mar. 14, 1944 |
| 2,424,486 | Miller | July 22, 1947 |

FOREIGN PATENTS

| | | |
|---|---|---|
| 665,044 | France | Apr. 30, 1929 |